Apr. 10, 1923.
L. M. BOWLUS
1,451,416
ICE BOX FOR FISH AND OTHER SEA FOODS
Filed Aug. 14, 1922    2 sheets-sheet 1
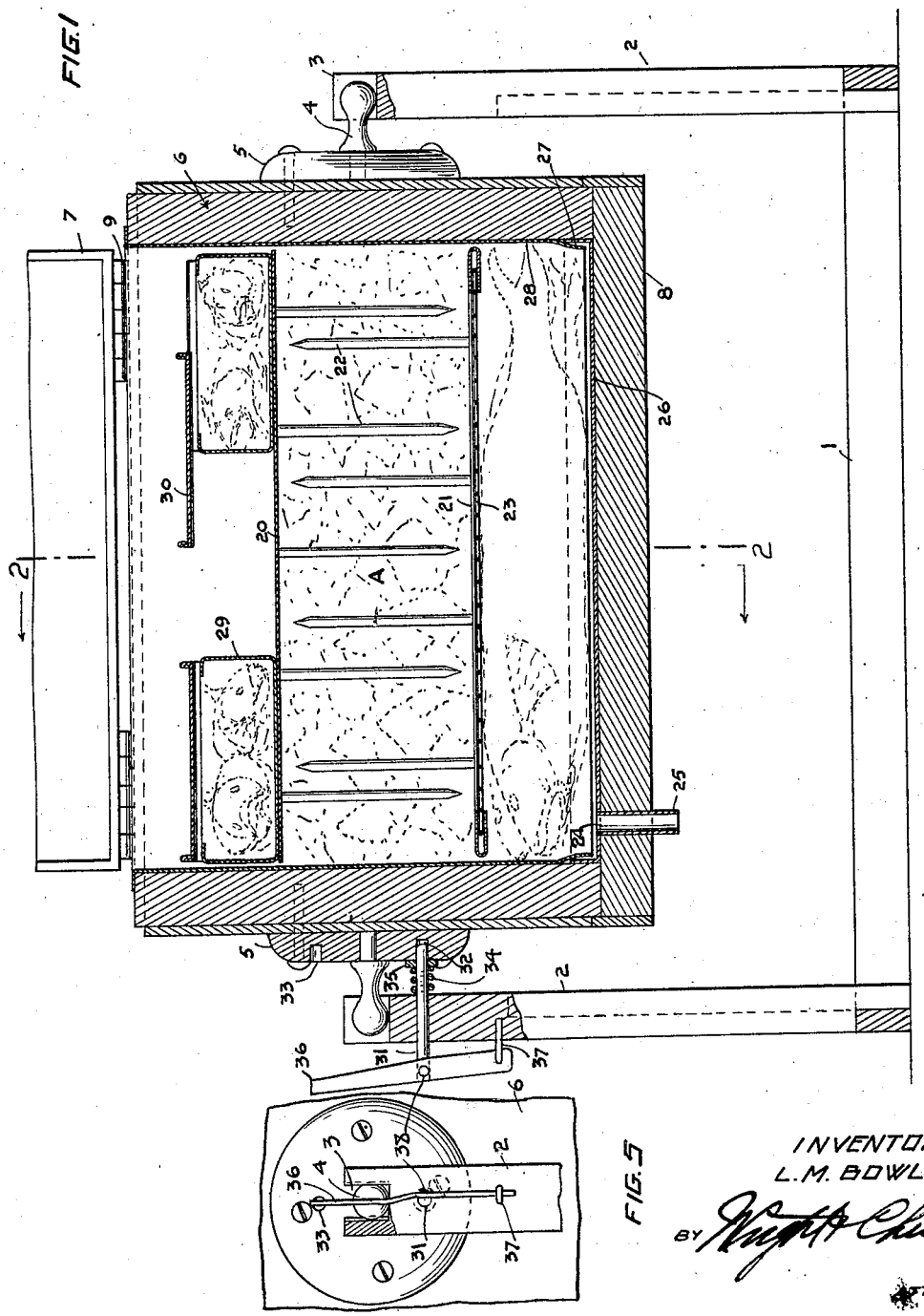
INVENTOR
L. M. BOWLUS Apr. 10, 1923.
L. M. BOWLUS
1,451,416
ICE BOX FOR FISH AND OTHER SEA FOODS
Filed Aug. 14, 1922   2 sheets-sheet 2
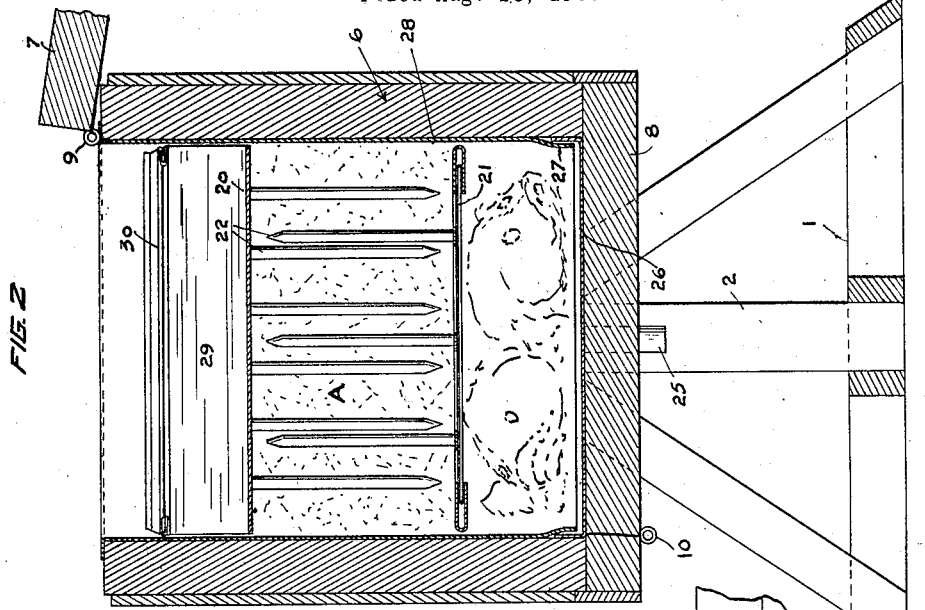
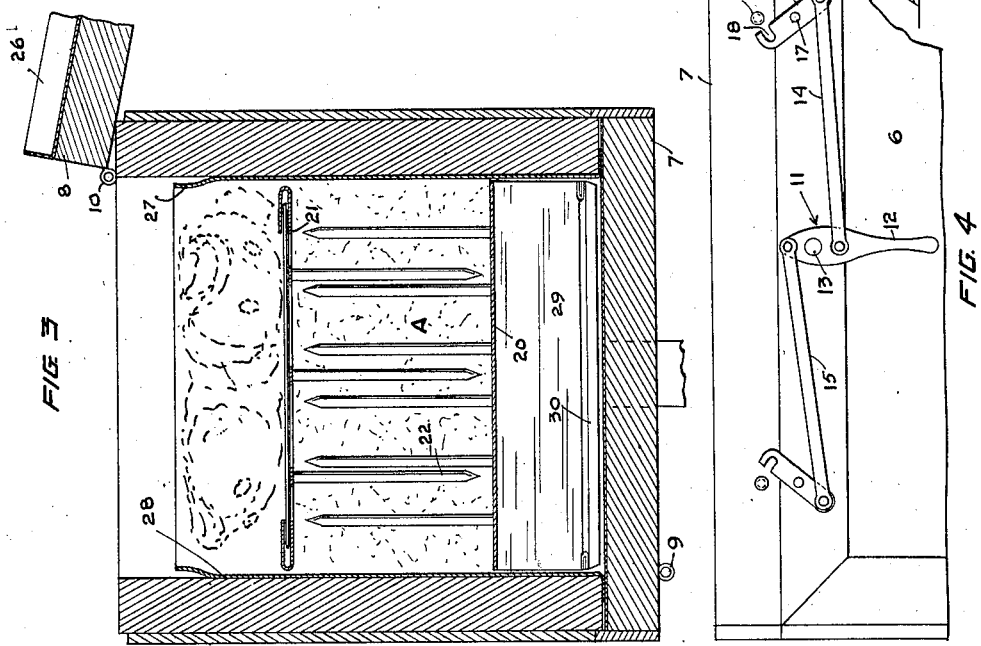
INVENTOR
L.M. BOWLUS
ATT'YS.

Patented Apr. 10, 1923.

1,451,416

UNITED STATES PATENT OFFICE.

LAUREN M. BOWLUS, OF SAN LUIS OBISPO, CALIFORNIA.

ICE BOX FOR FISH AND OTHER SEA FOODS.

Application filed August 14, 1922. Serial No. 581,694.

*To all whom it may concern:*

Be it known that I, LAUREN M. BOWLUS, a citizen of the United States, residing at San Luis Obispo, in the county of San Luis Obispo and State of California, have invented new and useful Improvements in Ice Box for Fish and Other Sea Foods, of which the following is a specification.

The present invention relates to improvements in ice boxes and has particular reference to ice boxes which are especially adapted for containing and preserving in a fresh state, fish and other sea foods.

An object of the invention is to provide an ice box of the character described by the use of which fish and other sea food may be preserved in a clean, sanitary and readily accessible manner.

The ordinary ice box or refrigerator is not suitable for storing or preserving fish or the like inasmuch as the odor of fish is taken on by other foods placed in the box, the presence of fish with other foods is objectionable and the drainage from the fish creates a disagreeable and unsanitary condition in and around the box.

With my invention fish and the like may be effectively exposed to the ice without actually contacting with the ice and the fish are so packed or contained with the box that they may be readily removed without disturbing the ice or pack of fish as is occasioned with the ordinary arrangement where the fish is packed with the ice.

My invention contemplates in one practical embodiment of the invention the provision of an ice box which is open on upper and lower sides and provided on said sides with hinged closures. The box is mounted so as to be reversible and provided with adjustable transverse partitions which are removably mounted with the box and arranged to contain between them, cracked ice. The space on one side of the partitions is adapted to contain fish in whole form or large portions of fish and is provided with a drain, it being the normally lower side of the box. The space on the other side is the normally upper side and is arranged to contain sliced fish meat or small fish or sea food particles such as halibut steaks, filet of sole, crab meat and the like. By reversing the box the normally lower side thereof is brought to uppermost position and upon opening the closure ready access to the fish may be had. The arrangement of the box is such that the fish may be readily removed without disturbing the ice and the packing of fish, the box may be readily packed and an effective cleaning and ventilating of the box is provided for.

Referring to the drawings Figure 1 represents a longitudinal sectional view of an ice box constructed in accordance with my invention showing a part of the frame in elevation and the lid of closure broken away.

Figure 2 represents a sectional view taken on line 2—2 of Figure 1.

Figure 3 is a view similar to Figure 2 but showing the box reversed.

Figure 4 is a fragmentary front elevation of the box and Figure 5 is a fragmentary end elevation showing in detail the means for holding the box in reversed and normal position.

Referring particularly to the drawings wherein there is illustrated one embodiment of the invention 1 designates a box frame to the ends of which are attached upwardly extending standards 2 having bifurcated upper ends 3 receiving a box or container 6. The box 6 may be made of any suitable material and is open on its upper and lower sides. Closures 7 and 8 in the nature of lids are hinged as at 9 and 10 to upper and lower sides of the box and are adapted to be held in closed position by latching mechanism generally designated 11. The latching mechanism for each closure comprises a lever 12 pivoted intermediate its ends as at 13 to the body of the box and having connected therewith on opposite sides of said pivot, links 14 and 15. The other ends of the links are pivoted to certain ends or levers 16 which are in turn pivoted intermediate their ends as at 17 to the body of the box and at their outer ends are notched as at 18. The notches 18 are adapted to receive pins or projections 19 carried on the lid. By moving the lever 12 in one direction the levers 16 will be moved so as to cause the notches 18 to receive pins 19 and opposite movement of the lever will withdraw the lever 16 from locking engagement with said pins. Any suitable form of latch or locking means for holding the lid in place may be used provided it may be readily operated and will effectively hold the lid in place.

The box is provided with transverse vertically adjustable and removable partition members 20 and 21 which extend entirely across the box and are provided on opposite sides with a plurality of spike-like projections 22. Ice as shown at A is placed between the partition members. The projections 22 will cause the ice to be evenly distributed and packed between the partitions. The partition 21 is provided with a series of perforations or openings 23 which permit of drainage of the water from the ice where the other partition is imperforated. The closure 8 is provided with a drain opening 24 from which a drain pipe 25 extends so that the drainage may be directed into a pan or receptacle (not shown) which may be placed beneath the box. A drain pan 26 is mounted on the inner side of the closure 8 and receives the inwardly off-set lower end 27 of the lining 28 of the box, so as to prevent leakage around the edges of the closure 8.

The outer side of the partition 20 has mounted thereon a plurality of small receptacles 29 which are open on their upper sides and adapted to contain small pieces of fish or other sea food such as halibut steaks, filet of sole, crab meat, etc. The upper sides of these receptacles are provided with closures 30 preferably of the sliding type and which are arranged so that they may be readily opened or closed.

With the box in normal position, the closure 8 being lowermost and held in closed position and the closure 7 in open position as shown in Figure 2, to pack the box, the partitions 20 and 21 are removed and fish or large pieces of fish or sea food are packed as desired in the pan 26. After the fish have been packed as shown in Figure 2 the partition 21 is lowered into place so as to rest upon the fish. The cracked ice is then placed on the partition 21 and is evenly distributed and separated by the projections 22. The partition 20 is then mounted within the box so as to rest upon the ice and a compartment is thereby provided for the ice. Any suitable quantity of ice may be used provided that it will not cause the upper partition to be so disposed so that the upper sides of the receptacle 29 will project above the upper side of the box. The spikes 22 limit the movement of the partition towards each other. Small particles of fish are placed within the receptacle 29 the closure 7 is closed and locked. Should it be desired to remove the small pieces of fish from the receptacles 29 it is only necessary to lift the lid 7 and open the closures 30. If it is desired to remove a large fish or large fish particle, the box is reversed so that the closure 8 is on the upper side and the closure 7 is on the lower side as shown in Figure 3 and upon opening the lid 8 ready access to the fish may be had.

Means is provided for automatically locking the box in its different positions which means in this instance comprises plunger 31 slidably mounted in one of the standards 2 and adapted at its inner end to extend into openings 32 and 33 provided in the plate 5. An expansion spring 34 is mounted on the plunger 31 and engages the standard 2 and a transverse pin 35 extending through the plunger, so that it will act to force the plunger into engagement with the outer surface of the plate 5. A lever 36 is pivoted as at 37 to the standard 2 and at a point intermediate of its ends is connected as at 38 with the outer end of the plunger. The openings 32 and 33 are so arranged that when the box is turned from one position to the other the plunger will automatically spring into engagement with one of the openings and the box will be held against movement. The plunger is withdrawn by pulling outwardly on the lever 36.

It will be seen that the ice box of my invention will be highly desirable for use in restaurants, hotels, cafés and other places where storing and preserving of fish is necessary, particularly since the fish will be preserved in a clean and sanitary manner and may be readily and easily removed without disturbing the arrangement of the ice and other fish in the box. One of the most essential features of the invention is the provision for cleanliness and sanitation in the preserving of fish, this being provided for by storing the ice between removable partitions and storing the fish between the partitions and the hinged lids or closures in an ice box which is reversible. By opening both lids after removal of partitions and the fish, the box may be easily and thoroughly cleaned and quickly ventilated.

I claim:

1. An ice box comprising a receptacle open on opposite sides, closures for said open sides, means on which the receptacle is reversibly mounted, partitions extending across the receptacle for containing therebetween a quantity of ice, said partitions providing fish storage spaces between them and the closures.

2. An ice box comprising a receptacle open on upper and lower sides, closures for said open sides and means on which the receptacle is reversibly mounted, partitions removably mounted within and extending across the receptacle for containing therebetween a quantity of ice, said partitions providing fish storage spaces between them and the closures, one of said partitions having openings therein and a drain in one of said closures.

3. An ice box comprising a receptacle open on its upper and lower sides, closures for said openings, partitions removably mounted within the box, arranged to contain ice between them and providing on opposite sides thereof storage spaces, access to which spaces may be had by opening said closures.

4. An ice box comprising a receptacle open on its upper and lower sides, closures for said openings, partitions removably mounted within the box, arranged to contain ice between them and providing on opposite sides thereof storage spaces, access to which spaces may be had by opening said closures, and projections on opposed faces of the partitions.

5. An ice box comprising a receptacle open on its upper and lower sides, closures for said openings, partitions removably mounted within the box, arranged to contain ice between them and providing on opposite sides thereof storage spaces, access to which spaces may be had by opening said closures, and receptacles carried upon one of said partitions and closures for said receptacles.

6. An ice box comprising a receptacle having at spaced points openings through which access to the interior of the receptacle may be had, closures for said openings, means on which said receptacle is movable to bring either of the openings into accessible position and partitions within the receptacle providing between them an ice receiving compartment and between them and the closures, storage compartments.

7. An ice box comprising a receptacle having at spaced points openings through which access to the interior of the receptacle may be had, closures for said openings, means on which said receptacle is movable to bring either of the openings into accessible position, partitions within the receptacle providing between them an ice receiving compartment and between them and the closures, storage compartments, and means for locking the receptacle when it is moved into position to permit access to one of the openings therein.

LAUREN M. BOWLUS.